2,997,447
AQUEOUS ACETYLENIC GLYCOL COMPOSITIONS

James P. Russell, North Bergen, and Morton W. Leeds, Union, N.J., assignors to Air Reduction Company, Incorporated, New York, N.Y., a corporation of New York
No Drawing. Filed Aug. 1, 1955, Ser. No. 525,806
12 Claims. (Cl. 252—351)

This invention relates to compositions which are useful as non-ionic non-foaming surface active agents. This application is a continuation-in-part of our copending application Serial No. 409,002, filed February 8, 1954, now abandoned.

The best known non-ionic surface active agents are essentially condensation products of polyethylene oxide in which the polyethylene oxide chain acts as the hydrophilic group and the hydrophobic group is derived from such materials as fatty alcohols, substituted phenols, fatty acids, fatty acyl amides, fatty alcohol glucosides and disulfimides. All of these non-ionic surface active agents have a relatively high molecular weight and produce a substantial amount of foam when introduced into aqueous systems. In many industrial applications it is highly desirable to employ a non-ionic wetting agent which produces a very little foam. For example, low foaming properties are desirable where the wetting agent is employed in detergent compositions for washing machines, and where a wetting agent is used in the textile field and it is desirable that the processor be capable of observing the material being treated.

In accordance with the present invention it has been found that the symmetrical tertiary acetylenic glycols possess remarkable wetting and surface tension lowering properties and, at the same time, have unexpectedly low foaming properties. It has been further found that the longer the main chain and the heavier the glycol molecule, the greater the wetting action. However, the solubility of the wetting agent in aqueous systems decreases with increase in molecular size. Consequently, it has been found that the symmetrical tertiary acetylenic glycols which correspond to the structural formula

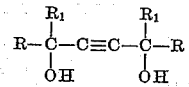

where R is an alkyl group, either branched or straight chain, containing 1 through 4 carbon atoms, e.g. methyl, ethyl, propyl, isopropyl, n-butyl, or isobutyl; and where $R_1$ is a radical selected from the group consisting of methyl, ethyl, cyclopropyl and phenyl, are most suitable as non-ionic non-foaming wetting agents.

Representative compounds of this new class of non-ionic non-foaming wetting agents are:

2,4,7,9-tetramethyl-5-decyne-4,7-diol
4,7-dimethyl-5-decyne-4,7-diol
2,3,6,7-tetramethyl-4-octyne-3,6-diol
3,6-diethyl-4-octyne-3,6-diol
2,5-dicyclopropyl-3-hexyne-2,5-diol
3,6-dimethyl-4-octyne-3,6-diol
2,5-diphenyl-3-hexyne-2,5-diol
2,5-dimethyl-3-hexyne-2,5-diol
5,8-dimethyl-6-dodecyne-5,8-diol The optimum agent, without regard to the cost of preparation, is 5,8-dimethyl-6-dodecyne-5,8-diol. It has been found that, all things considered, 2,4,7,9-tetramethyl-5-decyne-4,7-diol and 4,7-dimethyl-5-decyne-4,7-diol are the preferred wetting agents.

These symmetrical tertiary acetylenic glycols can be prepared in any of the known manners. For example, by reacting calcium carbide, an alkali metal hydroxide and the corresponding ketone to give the desired glycol in the fashion of Bruson et al. U.S. Patent No. 2,250,445; or by reacting ketones with an alkali-metal acetylide as shown by Kreimeier U.S. Patent No. 2,106,180; or by reacting acetylene with an excess of the ketone in the presence of solid caustic potash in a solvent medium, as is well known in the prior art.

Another advantageous characteristic of these symmetrical tertiary acetylenic glycols is their ability to withstand relatively strong alkali or strong acid mediums and still retain their wetting properties. The glycols remain useable for two hours in 5 percent NaOH at 100° C., and for longer periods in weaker solutions.

The acetylenic glycols of the present invention may be employed in any process, or incorporated in any composition, where it is desired to take advantage of their power to impart to aqueous mediums their wetting and impregnating properties. For example, these wetting agents can be effectively used in the various wet processing textile operations where their extremely low foaming properties would be particularly advantageous. The tertiary acetylenic glycols may be incorporated in dentifrices, toilet soaps, shampoos, and various laundry detergents, where their marked ability to lower surface tension and at the same time produce substantially no foam would be highly desirable. The glycols, may also be used as a pigment dispersant or as a viscosity depressant for inks and paint compositions which without the addition of these wetting agents would possess very poor flow properties. As a pigment dispersant for water-based paints containing a film-forming ingredient, the acetylenic glycols not only improve the distribution of the pigment particles uniformly throughout the paint formulation, but also reduce the formation of foam during both the grinding of the pigment and the formulation and application of the point composition. For such use as a pigment dispersant, the acetylenic glycol may be added alone or in combination with other surface-active agents, either undiluted or in solution in such materials as Carbitol, Cellosolve, ethylene glycol, or alcohol to eliminate foaming and give maximum color development in paints.

Further, the acetylenic glycols have also been found useful in reducing the viscosity of a variety of compositions, including vinyl plastisols, aqueous starch mixtures, polyvinyl alcohol solutions, and flexographic inks. The acetylenic glycols may also be used to inhibit gelation of such compositions as zein solutions, polyvinyl alcohol solutions, and flexographic inks. The surprising non-foaming character of the wetting agents of this invention suggests their use to suppress the foam produced by other surface active agents and to reduce the tendency to foam of various compositions where foam would be undesirable as, for example, coal tar pitch emulsions, paper mill sizes, and textile finishing compositions. Still further, the acetylenic glycols may be incorporated into water-based paint emulsions, such as those containing polyvinyl acetate, vinyl acetate copolymers, and butadiene-styrene copolymers, as freeze-thaw additives.

In addition, when employed in soaps or shampoos, the presence of small amounts of the acetylenic glycols is sufficient to impart some bactericidal properties as well as increased wetting properties.

When compounding detergent compositions which include one or more of the symmetrical tertiary acetylenic glycols, the usual builders, detergents, and sequestering agents may be employed. The alkali-metal phosphates, silicates and carbonates, such as sodium phosphate, sodium dihydrogen phosphate, sodium tripolyphosphate, sodium hexametaphosphate, sodium carbonate, sodium silicate, sodium metasilicate, and mixtures of these materials have been found particularly useful in this regard. Sequestering agents such as sodium hexametaphosphate or other water-softening agents such as trisodium phosphate may also be incorporated in such detergent formulations.

In preparing the compositions an amount of the glycol should be used sufficient to increase the wetting power of the system to which it will be added. It will be understood that the proportion of the glycol necessary to accomplish this result in each case cannot be exactly fixed since it is dependent upon the specific properties of the glycol employed, and the use to which the compositions are to be put. However, it has been found that generally the glycol is employed in proportions from about 0.05 to about 10 percent by weight of the aqueous composition to which it is added. The preferred proportions of the glycol depends upon a variety of factors most important of which are the result desired and the application intended. For example, as freeze-thaw additives for polyvinyl acetate emulsions, the glycol may be employed in amounts of about 0.5 percent by weight of the final emulsion; for viscosity reduction of starch solutions the glycol may represent from about 0.1–0.75 percent by weight of the aqueous starch solution; for viscosity reduction in vinyl plastisols it is desirable to employ about 2.0 percent by weight of the glycol based on the resin weight; for viscosity reduction and inhibiting gelation of polyvinyl alcohol solutions about 2–3 percent by weight of the acetylenic glycol based on the weight of polyvinyl alcohol may be used; for inhibiting gelation and reducing viscosity in flexographic inks the glycol is preferably employed in amounts of about 2 percent by weight of the total formulation; for suppression of foam in coal tar pitch emulsions and paper mill sizes it is advantageous to employ the glycol in about 0.1 to 0.2 percent by weight of the final composition; and when used as a pigment dispersant in paint compositions the glycol is preferably employed in amounts from about 0.1 to 0.3 percent by weight of the total paint formulation.

It has been further found that the wetting action of the acetylenic glycols can be unexpectedly enhanced by the addition of small amounts of ionic wetting agents such as Victawet 35B, $Na_5(2$-ethylhexyl$)_5(P_3O_{10})_2$, or Suframin, an alkyl aryl sulfonate. The addition of washing soda to the acetylenic glycols also enhances their wetting action.

Similarly, it has been found that synergistic surface active properties can be obtained by combining one or more of the symmetrical tertiary acetylenic glycols of this invention with another surface active agent. Surface active agents with which the tertiary acetylenic glycols have shown synergism include: (1) the anionic agents, such as sulfated or sulfonated oils (e.g., sulfated castor oil), alkyl aryl sulfonates (e.g., sodium dodecyl benzene sufonates), sulfated and sulfonated amides and amines (e.g., Igepon T), sulfated and sulfonated esters and ethers (e.g., sodium salt of sulfosuccinic acid dioctyl ester and the sulfated or sulfonated alkyl aryl polyglycol ethers), alkyl sulfates (e.g., sodium lauryl sulfate), and alkyl sulfonates; (2) the non-ionic agents, such as the polyhydric alcohol fatty acid esters (e.g., diglycol laurate, sorbitan monolaurate), polyoxypropylene glycol-ethylene oxide polymers, polyalkylene glycol esters, oxyethylated fatty acid partial esters of polyhydric alcohols, ethylene oxide-fatty alcohol condensates, alkyl aryl polyglycol ethers (e.g., nonyl phenol-ethylene oxide condensate) polyglycol thioethers, ethoxylated acid amides; and (3) the cationic agents, such as salts of primary and tertiary amines (e.g., hexadecyl amine hydroacetate), quaternary ammonium salts (e.g., hexadecyl dimethyl benzyl ammonium chloride), salts of amino amides (e.g., monostearoyl diethylene triamine dihydroacetate), quaternary ammonium salts of amino amides, quaternary derivatives of imidazolines, quaternary salts of amino esters. In addition to synergistically improving the wetting action of these other surface active agents, the acetylenic glycols will in many cases suppress the foam formation.

Set forth below in Tables 1–7 and in Examples 1–3 are experimental data to illustrate remarkable wetting properties of these symmetrical tertiary acetylenic glycols when employed alone and in combination with other well known wetting agents and detergents.

EXAMPLE 1

Since the Draves' test is an empirical wetting test that very nearly simulates practical wetting, the Draves' test was used to evaluate the composition.

The Draves' test for determining wetting action is fully described in the American Association of Textile Chemists and Colorists Year Book, 17, 216–222 (1940), and briefly, is performed as follows:

A standard skein of kier-boiled cotton thread, weighing 5.00 g. ($\pm$.10 g.) is formed into a double loop. The length of the loop is about seven inches. A copper-S-hook weighing 3.00 g. is hooked through the bottom. A piece of linen thread is tied to the other loop of the S-hook and at a distance of three inches along the thread from the hook it is tied to a 40.00 g. weight.

The liquid to be tested is placed in a cylinder two inches in diameter and twelve inches deep. About 750 ml. are required.

The skein is held in the hand and the weight is lowered gently into the liquid. The skein is released just as the S-hook reaches the surface of the liquid.

A stop watch is used to measure the time interval from the moment the bottom of the skein breaks the surface of the liquid until the S-hook sinks to the bottom (carrying the skein with it). The elapsed time is a measure of the wetting power, a shorter time indicating greater wetting power. A time in excess of six minutes is considered unsatisfactory.

All tests were made at 25° C. unless indicated otherwise. All solutions are in distilled water and are made up to the concentration shown in the data tables.

The experimental data are presented in Tables 1–6. All time values given are in seconds. The following symbols are used in the tables:

NG=time was in excess of six minutes.
I=instantaneous values.
S=Suframin, alkyl aryl sulfonate 85% active, concentrations listed are on basis of material as supplied by manufacturer.
V=Victawet 35B, $Na_5$(2-ethylhexyl)$_5(P_3O_{10})_2$, 70% active. Concentrations shown are on basis of material as supplied by manufacturer.
NaP=Sodium tripolyphosphate, $Na_5P_3O_{10}$, concentrations reported as percent should be interpreted as grams per 100 ml. of solution.

*Table 1*

WETTING POWER OF VARIOUS GLYCOLS IN AQUEOUS SOLUTION

| Concentration, percent | Compound | Wetting Power |
|---|---|---|
| 3 | Ethylene glycol | NG |
| 3 | Diethylene glycol | NG |
| 3 | Triethylene glycol | NG |
| 3 | Triethylene glycol+.02% S | NG |
| 2 | 2,5-Dicyclopropyl-3-hexyne-2,5-diol | 18 |
| .85 | 3,6-Diethyl-4-octyne-3,6-diol | 4 |
| .85 | 2,3,6,7-Tetramethyl-4-octyne-3,6-diol | I |
| .43 | 2,3,6,7-Tetramethyl-4-octyne-3,6-diol | 30 |

Table 2
WETTING POWER OF ADDITIVES WHEN USED ALONE

| Concentration: | Wetting power |
|---|---|
| .01% S | NG |
| .02% S | NG |
| .03% S | 72 |
| .10% S | 7½ |
| .01% V | NG |
| .02% V | NG |
| .03% V | NG |
| .20% V | 10 |
| .50% V | I |
| .05% NaP | NG |
| .10% NaP | NG |
| 5.0% NaP | NG |
| .05% NaP+.03% S | 16 |
| .10% NaP+.03% S | 16 |
| 2.5% Na$_2$CO$_3$ | NG |
| 2.5% Na$_2$CO$_3$+2.0% NaP | NG |
| 5.0% NaOH | NG |
| 1.0% NaOH | NG |
| 5.0% H$_2$SO$_4$ | NG |
| 1.0% H$_2$SO$_4$ | NG |

Table 5
DRAVES' VALUES
4,7-dimethyl-5-decyne-4,7-diol

| | Percent |
|---|---|
| Solubility in water | 0.85 |
| Solubility in 2% Na$_5$P$_3$O$_{10}$ | 0.66 |

| Concentration: | Wetting power |
|---|---|
| .85% | I |
| .50% | I |
| .43% | 4 |
| .30% | 26 |
| .21% | 43 |
| .20% | NG |
| .10% | NG |
| .125% | NG |
| .125%+.01% V | NG |
| .125%+.02% V | 210 |
| .125%+.03% V | 89 |
| .125%+2% NaP | NG |
| .125%+.01% V+2% NaP | NG |
| .125%+.02% V+2% NaP | 91 |
| .125%+.03% V+2% NaP | 44 |

Table 3
DRAVES' VALUES

| Concn., Ionic | 0 | | | .01% | | | .02% | | | .03% | | |
|---|---|---|---|---|---|---|---|---|---|---|---|---|
| Concn., Non-Ionic | — | +.05% NaP | +.10% NaP | — | +.05% NaP | +.10% NaP | — | +.05% NaP | +.10% NaP | — | +.05% NaP | +.10% NaP |
| 0 | NG | NG | NG | NG | | | NG | | | 73 | 16½ | 16½ |
| 1% | NG | NG | NG | 37 | 20 | 20 | 20 | 7½ | 7½ | 4½ | 5 | 5 |
| 2% | 24 | 24 | 37 | 5½ | 5 | 5 | 3 | I | I | I | I | I |
| 3% | I | | | I | | | | | | | | |

Non-ionic: 3,6-dimethyl-4-octyne-3,6-diol.
Ionic: Sulframin.
Other additive: Sodium Tripolyphosphate.

Table 4
DRAVES' VALUES

| Concn., Ionic | 0 | | | .01% | | | .02% | | | .03% | | |
|---|---|---|---|---|---|---|---|---|---|---|---|---|
| Concn., Non-Ionic | — | +.05% NaP | +.10% NaP | — | +.05% NaP | +.10% NaP | — | +.05% NaP | +.10% NaP | — | +.05% NaP | +.10% NaP |
| 0 | NG | NG | NG | NG | | | 163 | | | 33 | 33 | |
| 1% | NG | NG | NG | NG | | 205 | | 62 | 53 | | 42 | 44 |
| 2% | 24 | 24 | 37 | 16 | 15½ | 17½ | 8½ | 10 | 9½ | 5½ | 7½ | 7½ |
| 3% | I | | | I | | | | | | | | |

Non-ionic: 3,6-dimethyl-4-octyne-3,6-diol.
Ionic: Victawet 35B.
Other additive: Sodium Tripolyphosphate.

*Table 5—Continued*

Concentration—Continued | Wetting Power
--- | ---
.20%+2% NaP | NG
.20%+.01 V+2% NaP | 44
.20%+.02 V+2% NaP | 30
.20%+.03% V+2% NaP | 18
.5%+2% NaP | I
.5%+2% NaP+5% NaOH, fresh | I
After 20 hrs. room temp | I
After 2 hrs. reflux | 18
After 20 hrs. reflux | NG
.5%+2% NaP+1% NaOH, fresh | I
After 20 hrs. room temp | I
After 2 hrs. reflux | 4
After 4 hrs. reflux | 20
.5%+2% NaP+5% $H_2SO_4$, fresh | I
After 20 hrs. room temp | I
After reflux 2 hrs | NG
.66%+2% NaP | I
.44%+2% NaP | 6
.44%+2% NaP+2.5% $Na_2CO_3$, fresh | I
After 2 hrs. reflux | I
.33%+2% NaP | 37
.33%+2% NaP+2.5% $Na_2CO_3$, fresh | I
.22%+2% NaP | NG
.22%+2% NaP+2.5% $Na_2CO_3$, fresh | 55
After 2 hrs. reflux | 45
After 20 hrs. reflux | 49

*Table 6*

DRAVES' VALUES 2,4,7,9-tetramethyl-5-decyne-4,7-diol

| | Percent |
--- | ---
Solubility in water | 0.13
Solubility in 2% $Na_5P_3O_{10}$ | 0.11

Concentration: | Wetting power
--- | ---
.13% | 6
.11% | 15
.10% | 23
.065% | 49
.05% | 62
.11%+.01% V | 10
.11%+.02% V | 7
.11%+.03% V | 6
.10%+2% NaP | 23
.10%+.01 V+2% NaP | 10
.10%+.02% V+2% NaP | 6
.10%+.03% V+2% NaP | 5
.11%+2% NaP | 9
.11%+2% NaP+1% NaOH | 6
.11%+.01% V'+2% NaP+1% NaOH | 3
.11%+.02% V+2% NaP+1% NaOH | 1
.11%+2% NaP+.1% $Na_2CO_3$ | 9
.11%+2% NaP+.5% $Na_2CO_3$ | 7
.11%+2% NaP+1.0% $Na_2CO_3$ | 6
.11%+2% NaP+2.5% $Na_2CO_3$ | 3

EXAMPLE 2

The remarkable non-foaming properties of the symmetrical tertiary acetylenic glycols are illustrated in this example.

Foam measurements are made comparing the foaming characteristics of the acetylenic glycols of this invention with other known non-ionic surface active agents. The Ross-Miles foam test was carried out as described in the article by J. Ross and G. D. Miles in the May 1941 issue of Oil and Soap, pages 99–102; ASTM test D–1173–51T (ASTM Part 7, pages 644–646 (1952); and U.S. Patent No. 2,315,983. Ross and Miles chose to use the temperature of 25° C. (77° F.) while various companies published data at 110° and 120° F. Since the majority of known data and the ASTM uses 120° F., that temperature was selected for the tests shown below to aid the making of comparisons.

The method involves the use of a 200 ml. pipette and a meter-long thermostated receiver of 50 mm. internal diameter. The pipette is filled with the test solution and suspended centrally, 90 cm. above a small amount (50 ml.) of the same solution contained in the receiver. When released by opening a stop cock, the liquid in the pipette drains through a standard orifice (2.9 mm. internal diameter) into the receiver. This orifice is so designed that turbulence causes the stream of solution to break up into droplets just after emerging from it. Foam is produced when these droplets strike the surface of the liquid or foam in the receiver. The temperature at which the test is run is 120° F. and foam heights are recorded initially and after five minutes. The height of the foam in the column and its stability is indicative of the foaming properties of the agent tested.

In several instances, it was observed that the foam height rose as the concentration increased and then sharply declined as the concentration was raised further. This phenomenon is probably attributable to a surface tension decrease which becomes a factor at certain increasing concentrations.

The results definitely and clearly indicate that the acetylenic glycols of this invention are the lowest foam producing surface active agents tested. The values obtained for the acetylenic glycols are so close to those of water as to be almost indistinguishable.

*Table 7*

ROSS-MILES' FOAM TEST

[Temperature 120° F.]

| Substance | Concentration (percent by Wt. in Aqueous Solution) | Initial Height Readings (cms.) | Height After Five Minutes; Stability (cms.) |
--- | --- | --- | ---
| Water | | 0.0 | 0.0 |
| Triton 45 (alkyl aryl polyether alcohol) | 0.1 | 2.0 | 0.6 |
| | 0.5 | 2.1 | 1.2 |
| Triton X-155 (alkyl aryl polyether alcohol) | 0.1 | 1.0 | 1.0 |
| | 0.5 | 0.7 | 0.6 |
| Pluronic F-68 (ethylene oxide propylene oxide propylene glycol polymer) | 0.1 | 5.0 | 1.2 |
| | 0.5 | 24.1 | 1.5 |
| Pluronic L-44 (ethylene oxide propylene oxide propylene glycol polymer) | 0.1 | 4.0 | 1.3 |
| | 0.5 | 15.5 | 1.9 |
| Nonic 218 (polyethylene glycol tert. ethylene thioether) | 0.1 | 14.0 | 0.8 |
| | 0.5 | 25.2 | 1.7 |
| Cerfak No. 1300 (alkyl polyoxy ethylene thioether) | 0.1 | 6.0 | 0.7 |
| | 0.5 | 16.5 | 1.5 |
| Sulframin AB 40 (dodecyl benzene sulfonates) | 0.1 | 20.0 | 19.5 |
| 3,6-dimethyl-4-octynediol | 0.001 | 0.0 | 0.0 |
| | 0.01 | 0.0 | 0.0 |
| | 0.05 | 0.0 | 0.0 |
| | 0.1 | 0.0 | 0.0 |
| | 0.5 | 0.4 | 0.0 |
| | 1.0 | 0.5 | 0.3 |
| 4,7-dimethyl-5-decynediol | 5.0 | 0.0 | 0.0 |
| | 0.001 | 0.0 | 0.0 |
| | 0.01 | 0.0 | 0.0 |
| | 0.05 | 0.0 | 0.0 |
| | 0.1 | 0.0 | 0.0 |
| | 0.5 | 0.1 | 0.0 |
| 2,4,7,9-tetramethyl-5-decynediol | 0.001 | 0.0 | 0.0 |
| | 0.01 | 0.0 | 0.0 |
| | 0.05 | 0.0 | 0.0 |
| | 0.1 | 0.0 | 0.0 |

EXAMPLE 3

The synergistic effects obtained by combining various surfactants with the tertiary acetylenic glycols of this invention are illustrated by Table 8, below. Various combinations of 2,4,7,9-tetramethyl-5-decyne-4,7-diol with other surface active agents were dissolved in water in the percentages indicated in the table, and their effect on wetting was evaluated by the Draves' test, as described above in Example 1, at about 25°–27° C. The effect on foam was evaluated by visual observation. The percents given in Table 8 are by weight.

Table 8
SYNERGISM BETWEEN ACETYLENIC GLYCOLS AND OTHER SURFACE ACTIVE AGENTS

| 2,4,7,9-Tetramethyl-5-Decyne-4,7-Diol, Percent | Other Surfactant, Percent | Draves' Time, Sec. | Foam |
|---|---|---|---|
| 0.1 | None | 6 | No. |
| None | 0.1 Sterox CD (polyoxyethylene ester) | 193 | Yes. |
| 0.05 | 0.05 Sterox CD | 27.2 | No. |
| None | 0.1 Tamol 731 (sodium salt of a condensed sulfonic acid) | >300 | Yes. |
| 0.05 | 0.05 Tamol 731 | 24 | No. |
| None | 0.1 Aerosol OS (isopropylnaphthalene sodium sulfonate) | >300 | Yes. |
| 0.05 | 0.05 Aerosol OS | 27 | No. |
| None | 0.1 Aerosol OT (dioctyl sodium sulfosuccinate) | 1.5 | Yes. |
| 0.05 | 0.05 Aerosol OT | 0.5 | Yes. |
| None | 0.1 Triton X-100 (alkyl aryl polyether alcohol) | 8 | Yes. |
| 0.05 | 0.05 Triton X-100 | 4 | Yes. |
| None | 0.1 Pluronic F-68 (polyoxypropylene condensate) | >300 | Slight. |
| 0.05 | 0.05 Pluronic F-68 | 44 | None. |
| None | 0.1 Nonic 218 (polyoxyethylene alkyl thioether) | 6.4 | |
| 0.05 | 0.05 Nonic 218 | 2. | |
| None | 0.1 Igepal CO-880 (alkyl aryl polyether alcohol) | >300 | Stable. |
| 0.05 | 0.05 Igepal CO-880 | 10 | Unstable. |
| None | 0.1 Ultrawet SK (alkyl aryl sodium sulfonate) | 23 | |
| 0.05 | 0.05 Ultrawet SK | 4 | |
| None | 0.1 Tween 20 (polyoxyethylene sorbitan monolaurate) | 320 | Yes. |
| 0.05 | 0.05 Tween 20 | 10 | Yes. |
| None | 0.1 Tergitol NP-35 (alkyl aryl polyether alcohol) | 43 | High. |
| 0.05 | 0.05 Tergitol NP-35 | 4 | Low. |
| None | 0.1 Daxad 23 (polymerized alkyl aryl sodium sulfonate) | >300 | |
| 0.05 | 0.05 Daxad 23 | 120 | |
| None | 0.1 Cationic SP (alkyl ammonium dihydrogen phosphate) | >300 | Yes. |
| 0.05 | 0.05 Cationic SP | 35 | No. |
| None | 0.1 Pluronic L-62 (polyoxyethylene condensate) | 214 | |
| 0.05 | 0.05 Pluronic L-62 | 22 | |
| None | 0.1 Tetronic 304 (polyoxyethylene condensate with ethylene diamine) | >300 | Low. |
| 0.05 | 0.05 Tetronic 304 | 77 | None. |
| None | 0.1 Tetronic 704 (polyoxyethylene condensate with ethylene diamine) | >300 | High. |
| 0.05 | 0.05 Tetronic 704 | 20 | Low. |

EXAMPLE 4

A series of solid formulations consisting of Pluronic F-68 and an acetylenic glycol surface active agent were prepared in the following manner.

Pluronic F-68, an ethylene oxide-propylene oxide-propylene glycol polymer, and the acetylenic glycol were mixed together in a particular weight ratio to each other and heated until a molten mass was obtained. The liquid mixture was then stirred while cooling until solidification occurred. The formulations were then subjected to the Draves' test and the Ross-Miles' foam test to determine the effect of the mixture on wetting and foaming properties. The data obtained is recorded in Table 9.

It was observed that the incorporation of Pluronic F-68 unexpectedly enhanced the wetting properties of the formulation and facilitated dissolution of the wetting agent in the aqueous medium. (See Table 9.)

EXAMPLE 5

To determine the effect of acetylenic glycols on the dispersibility of pigments, raw pigment pulp, du Pont toluidine red, and the glycol were added to distilled water. The mixture was shaken for 30 minutes by means of a Burrell shaking machine. The resulting mixture was put into a Nessler tube and compared to a control blank of the pigment in water which was treated in the same manner. The results are indicated in Table 10 below.

Table 10

| Composition of Pigment Mixture | Results |
|---|---|
| 1.0% by wt. solid toluidine red pigment<br>5.0% by wt. dimethyl octynediol | some solid stayed dispersed for 3 days. |
| 1.0% by wt. solid toluidine red pigment | solid settled in a few minutes. |

EXAMPLE 6

Water-based paints of the following formulation were prepared employing various tertiary acetylenic glycols as dispersants for the organic pigment. In one case 2,4,7,9-tetramethyl-5-decyne-4,7-diol was used as the dispersant and in another 4,7-dimethyl-5-decyne-4,7-diol was employed.

| Ingredients | Grams | Wt. Percent |
|---|---|---|
| Rutile titania | 17.94 | 1.3 |
| Lithopone | 196.10 | 14.2 |
| Calcium carbonate | 47.69 | 3.4 |
| Clay | 61.85 | 4.4 |
| Silica | 81.38 | 5.9 |
| Toluidine red toner | 17.59 | 1.3 |
| Dispersant | 2.11 | 0.16 |
| Casein ammoniate solution | 158.40 | 11.6 |
| Butadiene-Styrene copolymer latex | 536.20 | 38.8 |
| Ethylene glycol | 10.83 | 0.8 |
| Water (deionized) | 247.70 | 17.9 |
| | 1,377.79 | 100. |

The paint was formulated in the following manner.

Table 9
COMPARATIVE VALUES, DRAVES' TEST 25° C. AND ROSS-MILES' FOAM TEST 120° F.

| Composition of Solid Agent | | Concentration Aqueous Solution | | Comparative Values Draves' Test 25° C. (seconds) | Comparative Values Ross-Miles' Foam Test 120° F. | |
|---|---|---|---|---|---|---|
| Percent Glycol | Percent Pluronic F-68 | Percent Glycol | Percent Pluronic F-68 | | Initial Reading (cm.) | Reading after 5 minutes (stability) (cm.) |
| 4,7-Dimethyl 5-decyne-4, 7-diol: | | | | | | |
| 66⅔ | 33⅓ | 0.30 | 0.15 | 18 | 5.0 | 0.8 |
| 100 | 0 | 0.30 | 0.00 | 26 | 0.0 | 0.0 |
| 0 | 100 | 0.00 | 0.15 | *NG | 8.7 | 2.5 |
| 2,4,7,9-tetramethyl-5-decyne-4,7-diol: | | | | | | |
| 50 | 50 | 0.10 | 0.10 | 4 | 3.5 | 0.4 |
| 100 | 0 | 0.10 | 0.00 | 23 | 0.0 | 0.0 |
| 0 | 100 | 0.00 | 0.10 | NG | 5.0 | 1.2 |

*NG=Indicates a reading of more than six minutes, or unsatisfactory as far as wetting properties are concerned.

The pigment and extenders were placed in a pebble mill (without the pebbles), and 62 grams of the casein ammoniate solution and 160 cc. of water containing the dispersant were added. The pebbles were introduced into the mill, and the ingredients were thoroughly mixed by grinding to form a paste. The remainder of the required casein ammoniate was added to the paste and mixed thoroughly. The paste was then added slowly to the latex-water mixture while gently stirring. Stirring was continued until the paint was uniform. Ethylene glycol was added as a freeze-thaw regulating ingredient.

No foaming developed during the grinding of the pigment and extenders to form the paste, whereas in those cases where no dispersant or conventional anionic dispersants had been used, excessive foaming occurred. Improved and greater color development was observed in those cases wherein a tertiary acetylenic glycol was employed as the pigment dispersant over that obtainable with a conventional anionic dispersant. In addition, as seen by Table 11, finer pigment particles were obtained when employing a tertiary acetylenic glycol as the pigment dispersant. The data presented in Table 11, was obtained by measuring samples taken at intervals during the grinding using a two-path Hegman gage calibrated 0.005" to 0" and 0 to 8 North Standards over a six-inch length. The North Standards of 0, 2, 4, 6, and 8 correspond to an average particle size of 4, 3, 2, 1 and 0 mils, respectively. The units given in Table 11 are in North Standards.

Table 11
HEGMAN FINENESS READING

| Hours of Grinding | 4 | 6 | 8 | 10 | 12 | 14 |
| --- | --- | --- | --- | --- | --- | --- |
| Dispersant: | | | | | | |
| None | 3½ | 4¾ | 5½ | 5¾ | 6 | 6½ |
| 4,7-Dimethyl-5-decyne-4,7-diol | 5 | 5½ | 6 | 6½ | 6¾ | 6¾ |
| 2,4,7,9-Tetramethyl-5-decyne-4,7-diol | 6 | 6¼ | 6¾ | 6¾ | 6¾ | 7 |

EXAMPLE 7

A detergent composition was formulated by mixing the following ingredients in the proportions indicated.

Ingredient: Percent by weight
2,4,7,9-tetramethyl-5-decyne-4,7-diol _____ 20
Carboxy methyl cellulose _____ Small amount
Sodium tripolyphosphate _____ 38
Mixture of alkali builders _____ Balance

100

In a standard detergency evaluation test, this detergent composition showed a soil removal of 52.9%. The composition was diluted at ½% in hot water, 140° F., for this test.

EXAMPLE 8

A detergent composition was formulated by mixing the following ingredients in the proportions indicated.

Ingredient: Percent by weight
4,7-dimethyl-5-decyne-4,7-diol _____ 20
Carboxy methyl cellulose _____ Small amount
Sodium tripolyphosphate _____ 38
Mixture of alkali builders _____ Balance

100

This detergent composition gave soil removal of 41.9% in a standard detergency evaluation test, where the detergent and composition was diluted at ½% in 140° F. water.

The foregoing detergency measurements are made on standard soiled cotton switches which, after being subjected to a tumbling washing action in the representative detergent solution were examined photoelectrically and gravimetrically to determine cleaning and soil removal values respectively.

EXAMPLE 9

A detergent composition containing a mixture of 2,4,7,9-tetramethyl-5-decyne-4,7-diol and Pluronic F-68 was formulated by mixing the following ingredients in the proportions indicated.

Ingredient: Percent by weight
50–50 mixture of 2,4,7,9-tetramethyl-5-decyne-4,7-diol and Pluronic F-68 _____ 20
Carboxy methyl cellulose _____ Small amount
Sodium tripolyphosphate _____ 38
Mixture of alkali builders _____ Balance

100

This detergent composition possessed increased wetting properties over the detergent composition of Example 8 above.

EXAMPLE 10

A detergent composition was prepared by mixing the following ingredients in the proportions indicated.

Ingredient: Percent by weight
1:1 mixture of 2,4,7,9-tetramethyl-5-decyne-4,7-diol and Sterox CD (a polyoxyethylene ester)_ 20
Sodium tripolyphosphate _____ 30
Tetrasodium pyrophosphate _____ 10
Sodium metasilicate pentahydrate _____ 10
Sodium sulfate _____ 15
Sodium bisulfate _____ 15

100

A cotton launderometer test was run in 15 grain water at 60° C., using 0.3 percent of the foregoing detergent composition. In accordance with the test, light swatches of desired cotton cloth were soiled by immersion in a mixture of coconut oil, fatty acids, mineral oil, and carbon black. Four soiled swatches were washed in water containing 0.3 percent by weight of the foregoing detergent composition, and the remaining four swatches were washed in water containing no detergent. After washing, the brightness of the swatches from each run were measured using a Hunter reflectometer calibrated so that a magnesia block gave a reading of 100.

Run: Soil removal brightness units
Water _____ 2.1
Detergent mixture _____ 7.6

EXAMPLE 11

A dishwashing composition was prepared, comprising the following ingredients in the amounts indicated:

Ingredient: Percent by weight
Surfactant _____ 10
Sodium tripolyphosphate _____ 40
Tetrasodium pyrophosphate _____ 20
Sodium metasilicate pentahydrate _____ 10
Soda ash _____ 20

100

The dishwashing effectiveness of this composition which contained various mixtures of a tertiary acetylenic glycol and another wetting agent as the surfactant was determined as follows. Glass wicking, soiled with hydrogenated vegetable oil and carbon black, was scoured at 60° C. in a 0.2 percent solution of the dishwashing formulation containing the surfactants listed below in two grain water. The percentage of soil remaining on the wicking was determined by hexane extraction.

Surfactant: Percent soil not removed
1:1 mixture of 2,4,7,9-tetramethyl-5-decyne-4,7-diol and Sterox CD (polyoxyethylene ester) _____ 37.5
1:1 mixture of 2,4,7,9-tetramethyl-5-decyne-4,7-diol and Pluronic F-68 (polyoxypropylene condensate) _____ 24.2
Water _____ 90.5

EXAMPLE 12

The acetylenic glycols were incorporated in hand soap to improve the cleansing properties of such soaps. Ordinary cake hand soap was ground, and 1.0% of 2,4,7,9-tetramethyl-5-decyne-4,7-diol was intimately admixed with the ground soap, and the mixture was molded into cakes of soap.

Other soap cakes were made containing 0.1 percent and 5.0 percent by weight of the tetramethyl decynediol, and 0.1 percent, 1.0 percent, and 5.0 percent by weight of 4,7-dimethyl-5-decyne-4,7-diol.

EXAMPLE 13

The following data will illustrate the ability of the symmetrical tertiary acetylenic glycols of this invention to reduce the viscosity of vinyl plastisols. The acetylenic glycol, as indicated in Table 12 below, was incorporated in a vinyl plastisol comprising 100 parts of a polyvinyl chloride resin and 65 parts of dioctyl phthalate plasticizer. The glycol was employed in an amount of 2 percent by weight of the resin. Viscosities were determined at various intervals at a temperature of 26° C.

*Table 12*

VISCOSITY REDUCTION IN VINYL PLASTISOLS

| Acetylenic Glycol | Initial | 4 Days | 15 Days | 30 Days | 100 Days |
|---|---|---|---|---|---|
| None | 7,600 | 13,700 | 20,000 | 23,400 | 44,100 |
| 3,6-Dimethyl-4-octyne-3,6-diol | 4,400 | 6,500 | 8,800 | 12,900 | 22,900 |
| 4,7-Dimethyl-5-decyne-4,7-diol | 5,000 | 8,000 | 10,700 | 15,900 | 20,600 |
| 2,4,7,9-Tetramethyl-5-decyne-4,7-diol | 4,900 | 7,750 | 10,700 | 15,400 | 21,000 |

EXAMPLE 14

Table 13 below illustrates the viscosity reduction properties of the tertiary acetylenic glycols in aqueous starch solutions. Aqueous solutions containing 12 percent by weight of potato and corn starch containing the indicated acetylenic glycols were prepared. Viscosities were measured at 80° C.

*Table 13*

VISCOSITY REDUCTION OF AQUEOUS STARCH SOLUTIONS

| Potato Starch | | Corn Starch | |
|---|---|---|---|
| Acetylenic Glycol Percent by Weight | Viscosity (cps.) | Acetylenic Glycol Percent by Weight | Viscosity (cps.) |
| None | 22,600 | None | 25,180 |
| 0.05% 2,4,7,9-Tetramethyl-5-decyne-4,7-diol | 10,620 | 0.5% 2,4,7,9-Tetramethyl-5-decyne-4,7-diol | 11,650 |
| 0.1% 2,4,7,9-Tetramethyl-5-decyne-4,7-diol | 8,800 | 0.1% 2,4,7,9-Tetramethyl-5-decyne-4,7-diol | 10,550 |
| 0.05% 4,7-Dimethyl-5-decyne-4,7-diol | 9,450 | 0.05% 4,7-Dimethyl-5-decyne-4,7-diol | [1] 15,900 |
| 0.1% 4,7-Dimethyl-5-decyne-4,7-diol | 6,100 | 0.1% 4,7-Dimethyl-5-decyne-4,7-diol | 18,380 |
| 0.4% 4,7-Dimethyl-5-decyne-4,7-diol | 6,050 | 0.2% 4,7-Dimethyl-5-decyne-4,7-diol | 7,500 |
| 0.6% 4,7-Dimethyl-5-decyne-4,7-diol | 5,750 | 0.6% 4,7-Dimethyl-5-decyne-4,7-diol | 7,000 |
| 0.6% 4,7-Dimethyl-5-decyne-4,7-diol | [2] 10,850 | 1.0% 4,7-Dimethyl-5-decyne-4,7-diol | 6,300 |
| 0.5% 3,6-Dimethyl-4-octyne-3,6-diol | 15,000 | 0.25% 3,6-Dimethyl-4-octyne-3,6-diol | 13,400 |
| 1.0% 3,6-Dimethyl-4-octyne-3,6-diol | 8,400 | 0.5% 3,6-Dimethyl-4-octyne-3,6-diol | 7,800 |
| 2.0% 3,6-Dimethyl-4-octyne-3,6-diol | 6,900 | 1.0% 3,6-Dimethyl-4-octyne-3,6-diol | 4,500 |
| 5.0% 3,6-Dimethyl-4-octyne-3,6-diol | 6,400 | 4.0% 3,6-Dimethyl-4-octyne-3,6-diol | 5,400 |
| | | 5.0% 3,6-Dimethyl-4-octyne-3,6-diol | 9,800 |

[1] After 32 hrs.
[2] After 16 hrs.

EXAMPLE 15

A solution was prepared comprising 50 parts zein, 40 parts ethanol, and 10 parts water. This solution gelled at room temperature after 4½ weeks. A similar batch which contained, in addition to the foregoing ingredients, 0.1 part of 2,4,7,9-tetramethyl-5-decyne-4,7-diol did not gel after 8 weeks.

It will be recognized by those skilled in the art that the compositions described above are not exhaustive. Various changes may be made in proportions and in additive ingredients. Other applications for these novel acetylenic glycol wetting agents would readily suggest themselves to those skilled in the art. As already stated above, these acetylenic glycols may be employed in any process, or incorporated in any composition, where it is desired to take advantage of their power to impart to aqueous systems their wetting and impregnating properties.

What is claimed is:

1. The method of reducing the surface tension and increasing the wetting properties of an aqueous system which comprises adding to said system from about 0.05 percent to about 10.0 percent by weight of the aqueous system of a symmetrical tertiary acetylenic glycol having a structure designated by the formula:

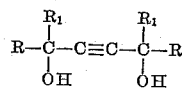

wherein R is an alkyl group containing from 1–4 carbon atoms, and $R_1$ is a radical selected from the group consisting of methyl, ethyl, cyclopropyl, and phenyl.

2. The method of reducing the surface tension and increasing the wetting properties of an aqueous system which comprises adding to said system from about 0.05 percent to about 10.0 percent by weight of the aqueous system of 2,4,7,9-tetramethyl-5-decyne-4,7-diol.

3. The method of reducing the surface tension and increasing the wetting properties of an aqueous system which comprises adding to said system from about 0.05 percent to about 10.0 percent by weight of the aqueous system of 4,7-dimethyl-5-decyne-4,7-diol.

4. The method of reducing the surface tension and increasing the wetting properties of an aqueous system which comprises adding to said system from about 0.05 percent to about 10.0 percent by weight of the aqueous system of 3,6-dimethyl-4-octyne-3,6-diol.

5. The method of reducing the surface tension and increasing the wetting properties of an aqueous system which comprises adding to said system from about 0.05 percent to about 10.0 percent by weight of the aqueous system of 2,5-diphenyl-3-hexyne-2,5-diol.

6. The method of reducing the surface tension and increasing the wetting properties of an aqueous system which comprises adding to said system from about 0.05 percent to about 10.0 percent by weight of the aqueous system of 5,8-dimethyl-6-dodecyne-5,8-diol.

7. An aqueous composition comprising water and from about 0.05 percent to about 10.0 percent by weight of the aqueous composition of a symmetrical tertiary acetylenic glycol having a structure designated by the formula:

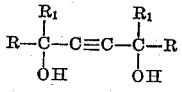

wherein R is an alkyl group containing from 1–4 carbon atoms, and $R_1$ is a radical selected from the group consisting of methyl, ethyl, cyclopropyl, and phenyl, the quantity of said acetylenic glycol being sufficient to substantially reduce the surface tension and increase the wetting properties of said aqueous composition.

8. An aqueous composition comprising water and from about 0.05 percent to about 10.0 percent by weight of the aqueous composition of 4,7-dimethyl-5-decyne-4,7-diol, the quantity of said diol being sufficient to substantially reduce the surface tension and increase the wetting properties of said aqueous composition.

9. An aqueous composition comprising water and from about 0.05 percent to about 10.0 percent by weight of the aqueous composition of 2,4,7,9-tetramethyl-5-decyne-4,7-diol, the quantity of said diol being sufficient to substantially reduce the surface tension and increase the wetting properties of said aqueous composition.

10. An aqueous composition comprising water and from about 0.05 percent to about 10.0 percent by weight of the aqueous composition of 5,8-dimethyl-6-duodecyne-5,8-diol, the quantity of said diol being sufficient to substantially reduce the surface tension and increase the wetting properties of said aqueous composition.

11. An aqueous composition comprising water and from about 0.05 percent to about 10.0 percent by weight of the aqueous composition of 3,6-dimethyl-4-octyne-3,6-diol, the quantity of said diol being sufficient to substantially reduce the surface tension and increase the wetting properties of said aqueous composition.

12. An aqueous composition comprising water and from about 0.05 percent to about 10.0 percent by weight of the aqueous composition of 2,5-diphenyl-3-hexyne-2,5-diol, the quantity of said diol being sufficient to substantially reduce the surface tension and increase the wetting properties of said aqueous composition.

References Cited in the file of this patent

UNITED STATES PATENTS

| | | |
|---|---|---|
| 1,394,280 | Cook | Oct. 18, 1921 |
| 2,250,445 | Bruson et al. | July 29, 1941 |
| 2,601,315 | Morrison et al. | June 24, 1952 |
| 2,656,327 | Van Wirt et al. | Oct. 20, 1953 |
| 2,679,482 | Ross | May 25, 1954 |
| 2,801,160 | Iserson | July 30, 1957 |

OTHER REFERENCES

Acetylinic Compounds, Johnson Arnold & Co., London, 1946, vol. 1, pages 274–340.